United States Patent [19]

Becker

[11] 4,371,554
[45] Feb. 1, 1983

[54] METHOD OF MAKING SKINLESS SAUSAGE USING REUSABLE POROUS POLYTETRAFLUOROETHYLENE CASING

[75] Inventor: Heinz Becker, Zurich, Switzerland

[73] Assignee: Ashland Food Technology Holdings S.A., Luxembourg

[21] Appl. No.: 201,155

[22] Filed: Oct. 27, 1980

[30] Foreign Application Priority Data

Nov. 9, 1979 [CH] Switzerland ............. 10067/79

[51] Int. Cl.³ .............. A22C 11/00; A22C 13/00; A23L 1/31
[52] U.S. Cl. ..................... 426/243; 17/1 F; 17/49; 134/1; 138/118.1; 222/340; 425/89; 425/444; 426/105; 426/135; 426/241; 426/246; 426/315; 426/513; 426/389; 426/523; 428/36
[58] Field of Search ............ 426/105, 415, 412, 118, 426/135, 241, 246, 243, 315, 513, 389, 523; 138/118.1; 17/1 F, 49, 35; 428/36; 425/89

[56] References Cited

U.S. PATENT DOCUMENTS

| 1,964,009 | 6/1934 | Vogt | 426/315 |
|---|---|---|---|
| 2,698,800 | 1/1955 | Rueckert | 426/140 |
| 2,698,801 | 1/1955 | Luce | 426/513 |
| 2,779,968 | 2/1957 | Hensgen | 17/1 F |
| 3,233,281 | 2/1966 | Swift | 17/35 |
| 3,421,434 | 1/1969 | Krachmer | 17/35 |
| 3,813,731 | 6/1974 | Becker et al. | 426/105 |
| 3,953,566 | 4/1976 | Gore | 264/288 |
| 3,962,153 | 6/1976 | Gore | 521/79 |
| 4,283,448 | 8/1981 | Bowman | 428/36 |

FOREIGN PATENT DOCUMENTS

| 2313994 | 10/1973 | Fed. Rep. of Germany . |
|---|---|---|
| 2523506 | 5/1975 | Fed. Rep. of Germany . |
| 2756995 | 6/1979 | Fed. Rep. of Germany . |
| 1202533 | 3/1958 | France . |
| 2336885 | 7/1977 | France . |
| 998410 | 7/1965 | United Kingdom . |

OTHER PUBLICATIONS

Branson Brochure, "Ultrasonic Cleaning and Vapor Decreasing".
Chemplast Product Guide.

Primary Examiner—Steven L. Weinstein
Attorney, Agent, or Firm—Finnegan, Henderson, Farabow, Garrett & Dunner

[57] ABSTRACT

A reusable tubular casing is made of porous polytetrafluoroethylene (PTFE) membrane for the production of caseless (skinless) parboil or raw sausages. The membrane has a microstructure comprising PTFE nodes connected by PTFE fibrils with a porosity of about 70-80%, a Gurley No. less than about 28 seconds, a Bubble Point Pressure greater than about 13, and a Water Entry Pressure greater than about 40 psig. The casing is contacted on at least a part of its circumferential area by a porous support such as a cylindrical lattice. A new process for production of parboil or raw sausage involves heating the sausage in casing formed by a reusable non-adherent, vapor permeable membrane to drive off moisture and other volatile materials, and removing the sausage from the casing. The sausage can subsequently be smoked and the casing reused.

7 Claims, 13 Drawing Figures

METHOD OF MAKING SKINLESS SAUSAGE USING REUSABLE POROUS POLYTETRAFLUOROETHYLENE CASING

BACKGROUND OF THE INVENTION

1. Field of the Invention

This invention relates to apparatus and process for making caseless (skinless) sausage. In particular, this invention relates to a particular reusable tubular casing and associated apparatus for making parboil or raw sausage.

2. Description of the Prior Art

In general, the art recognized three types of sausages: cooking sausage, parboil sausage, and raw sausage. Cooking sausage has a higher fat and protein content and accordingly contains a smaller amount of water than the parboil sausage. For this reason cooking sausage releases practically no water during the heating process, and can therefore be produced in casings that are impenetrable by water vapor and steam evolved during the sausage-making process. For example, many organic polymeric materials that are impervious to water and steam, can be used with cooking sausage.

On the other hand, a larger amount of water is released during reddening and coagulation of the parboil sausage, and during the reddening and ripening process for raw sausage.

Parboil sausage is produced from an emulsion in water of a protein and fat. During the formation of this emulsion in high capacity grinding or cutting machines, ice is used for cooling. For this reason, the bulk sausage contains more water than is permissible for the preservation, of the sausage. Therefore, the bulk sausage must release about 5 to 50% (as an average about 10%) gaseous constituents, in relation to the raw (unprocessed sausage meat) weight. These gaseous constituents consist for the most part of water vapor or steam, but also contain aromatic constituents and other volatile substances released during the heating steps for reddening and/or coagulation.

The reddening of parboil sausage occurs as a rule at about 35° C. within approximately 15 minutes; the coagulation must be carried out at temperatures above 45° C. and takes place as a rule by heating in water or steam at temperatures between 70° and 100° C., usually at about 80° C., in a relatively short time.

Almost all parboil sausages are smoked. It is a general practice to complete the smoking process after reddening, but before coagulation. Since the sausage casings in use at the present time have little permeability for smoke, the smoking process normally takes a long time.

Raw sausage is produced from bulk sausage which contains fat and meat pieces of various size. During the reddening and ripening process the bulk sausage releases gaseous constituents from about 10 to 50%, as related to the raw (unprocessed bulk) weight. These gaseous constituents also consist for the most part of water vapor, however, they also contain aromatic constituents and substances volatile under the conditions of the reddening and/or ripening process.

The reddening and ripening of raw sausage occurs at temperatures not above 40° C., as a rule at around 20° C. The reddening and ripening occurs quite slowly during the course of a few days up to several months. Some types of raw sausages are also smoked. In the reddening and ripening process for others, as for instance salami, mildew (mold) is expected to form.

In original sausage making procedures, the bulk sausage was injected into a natural intestine and subsequently subjected to the treatment required by a particular type of sausage. Artificial intestines made of various materials have been known for quite some time. Most of the natural and artificial intestines used for sausage casings are inedible and must be removed before consumption. Therefore, it has become the practice to peel the sausage casing right at the production plant.

Another technique has been used in sausage making, namely the production of so-called caseless sausages (also designated as skinless sausages), in order to reduce the expense incurred in peeling the sausage casings, the loss of sausage material because the sausages break when the casings are peeled away, and, in addition, the guite sizable cost of the casings themselves.

According to German Patent Publication DE-OS 25 23 506, caseless sausages are produced continuously by a machine that is provided with numerous molds, which after removal of the formed and cooked sausage, and after cleaning of the mold, can be used again. One by one these molds pass thru a fill station in the machine; a boiling or, as the case may be, a cooking oven; a cooling station; and a mold removal station, whereby between the mold removal station and the following fill station preferably a wash and/or cleaning station is provided. The molds are preferably made of a material having a low coefficient of friction, for instance "tetrafluoroethylene". This designation obviously is to mean "polytetrafluoroethylene". It is, however, in no way indicated that the material used for the molds could be or were required to be pervious for gas.

German Patent Publication DE-OS Number 27 56 995 refers to a process and apparatus for the production of a skinless, chord-like sausage by means of a hull designed as a chord-shaped hollow body which is designated expressly as "practically medium-tight" or "practically medium-tight sealable". The inside of the hollow body may have a smooth anti-sticking layer which, for instance, could be a coating of polytetrafluoroethylene. According to the process described in DE-OS 27 56 995, the raw bulk sausage is filled into the casing, then heated, possibly followed by cooling, and finally divided into suitable lengths. The pressure created during heating due to the expansion of the bulk sausage causes a pressure seal which prevents vapor evolved during cooking to reach the casing exit.

It is also known that a special paper made into an endless tube can be impregnated with viscose (a viscous solution of cellulosexanthogenate, which is used for the production of viscose rayon, viscose staple fibers, viscose cellophane and viscose sponges), to form a tubular casing which has a degree of porosity which permits the exchange of moisture and steam. Such viscose impregnated paper tubes can be used for sausages that are to be smoked, because their permeability allows for some penetration of smoke, at least to a degree that exceeds the smoke penetration of most other known sausage casings. Experience has shown that all known multiple reusable but nonporous casings are not suitable for the production of sausage types which must release water vapor, steam and other gaseous constituents. It is, of course, not possible to remove the water vapor, steam and other gaseous constituents from the sausage material before filling.

Also, a previous effort to use a finely perforated sausage wrapper having a large number of holes per square centimeter proved to have severe shortcomings with respect to providing a smooth outer sausage surface, and presented cleaning problems.

SUMMARY OF THE INVENTION

A multiple reusable porous casing for the production of caseless parboil or raw sausages must meet the following requirements:

1. The casing must have a sufficiently high permeability for water vapor, steam and other gases, like oxygen and aromatic constituents. A cellulose material which, however, is suited for one time use only and is not part of the present invention, may release for instance 5.5 μl of water vapor or steam per minute per square centimeter. Similar characteristics are desirable for multiple reusable casings.

2. The casing, even by multiple reuse, must neither release constituents injurious to health nor may it adversely affect the taste, smell or appearance of the sausage.

3. The pores must not, or at least only to a small degree, become plugged with fat, so their permeability is not decreased.

4. The casing must be easy to clean.

5. The casing must have a continuous thermal tolerance of at least 200° C.

6. The casing must have good mechanical stability and be pliant.

7. The casing must not adhere to the bulk sausage.

8. The internal surface of the tubular membrane must contain openings that are small enough so that the sausage's integral external surface has a smooth appearance.

The invention involves the discovery that a porous polytetrafluoroethylene (PTFE) membrane with a microstructure comprising PTFE nodes which are connected with each other by PTFE fibrils, is suited for this purpose. This material can be produced having small fibril lengths to yield effective pore sizes no more than 1.0 μm, preferably no more than 0.5 μm, and optimally no more than 0.2 μm. It is preferred that the membrane have a nominal thickness of 0.01 to 5 mm and a nominal porosity of 30 to 99, and preferably 55 to 85%. Membranes of this type, their characteristics and production, are known from U.S. Pat. Nos. 3,953,566 and 3,962,153 as well as the corresponding German Publications DE-AS 21 23 316 and 24 17 901; therefore, they need not be described in detail.

The PTFE membrane of the casing of the present invention has sufficient porosity to permit venting radially through the casing, the steam, water vapor and other gaseous fluids released during processing from the sausage present within the casing. The PTFE membrane also has a surface texture to provide easy release of the processed sausage from the casing following processing while maintaining the integrity of the sausage surface and the sausage as a whole. Furthermore, the gaseous fluid flow paths through the node and fibril microstructure of the membrane limits the extrusion of solid or liquid sausage material through the membrane during filling of the casing, thus preserving the desired high degree of porosity and low adhesion between the sausage material and casing inner wall.

As used in U.S. Pat. No. 3,953,566 and as defined herein, porosity is equal to the void fraction of the PTFE membrane expressed as a percentage. That is, porosity Q is equal to void fraction times 100, where
void fraction + polymer fraction = 1.

The void fraction fv can be calculated from the specific gravity of the membrane as follows:

$$f_v = 1 - \frac{SG}{SG_p}$$

where SG is the specific gravity of the porous PTFE membrane, and $SG_p$ is the specific gravity of the PTFE polymer, and is generally equal to about 2.15

Thus, the porosity can be determined from the following relationship:

$$Q = \left[1 - \frac{SG}{2.15}\right](100)$$

The required permeability for the evolved gas (water vapor, steam, aromatic constituents, etc.) for a certain type of sausage and at a particular temperature is easily calculated with near accuracy, if one (a) assumes that the specific gravity of the raw bulk sausage is equal to 1, (b) does not take into account the existing sausage ends, (c) knows the amount of water to be released percentage-wise (%) in relation to the raw bulk sausage, and (d) knows the time available for the release of the gases at the particular temperature.

Given these prerequisites the volume $V_w$ of the sausage therefore is:

$$V_W = \pi R^2 L$$

and the surface area $O_W$ of the sausage is:

$$O_W = 2\pi R L$$

where R is the radius and L is the length of the sausage. If the amount of water to be released is designated as $P_W$ in percent (%), in relation to the raw bulk sausage, and the time available for the release of the gases at a given temperature T is designated as $t_T$, the permeability for gas at a temperature T is as follows:

$$\frac{\pi R^2 L \times P_W}{2\pi R L \times t_T} = \frac{R \times P_W}{2 t_T}$$

Therefore it follows that the bigger the radius of the sausage, and the larger the amount of water to be released, the higher the gas permeability must be; and the gas permeability can also be that much smaller the more time that is available for the release of gas.

A porous PTFE membrane suitable for the production of parboil sausage, like hot dogs, vienna sausages, frankfurters, Lyon sausage, Mortadella and so on, has the following characteristics:

| | | |
|---|---|---|
| (a) | effective size of pores | maximum 0.2 μm |
| (b) | nominal thickness | 0.003 inches |
| (c) | nominal porosity | 78% |
| (d) | nominal density | 0.4 g/cm³ |
| (e) | air permeability | minimum 215 cm³ per minute and per |

-continued

| | | |
|---|---|---|
| | | square inch at 4.88 inches of head of water |
| (f) | the time required for 500 cm³ of methanol to pass thru 9.6 cm² area of the membrane at 21° C. and a vacuum of 27 inches of mercury (Hg): | maximum 120 seconds |
| (g) | water entry pressure | minimum 40 pounds per square inch (40 p.s.i) |
| (h) | bubble point (methanol) | minimum 13, maximum 22 p.s.i. (pounds per square inch) |
| (i) | the time required for 100 cm³ of air to pass thru 1 square inch of the membrane area at 4.88 inches of head of water | maximum 28 seconds |

Measurements (e) and (i) are typically done with the apparatus and procedure detailed in ASTM Method D-726-58 Method A using 1.00 sq. inch test area, and 4.88 in. head of water. The measurement in (i) represents the "Gurley Number" of the membrane.

Measurements (f) and (h) are typically done with the apparatus and procedure detailed in ASTM Method F-316-70, using anhydrous methanol at 21° C. and a 9.6 sq. cm test area.

Measurement (g) utilizes apparatus employed in the Mullin's Burst Test (Fed. Std. 191, Method 5512). The test procedure consists of raising the pressure of water to a test level over a period of approximately 10 seconds, holding the pressure at that level for 30 seconds, and visually determining the presence or absence of leakage. The lowest water pressure at which leakage is observed is the Water Entry Pressure of the membrane.

A preferred range of porous PTFE membrane is as follows:

| | |
|---|---|
| thickness: | 0.0015"–0.0035" (.04 mn–.09 mm) |
| weight/area: | 2.79–4.03 mg/cm² |
| density: | 0.44–0.63 g/cm³ (corresponds to a porosity of about 70–80%) |
| Gurley No.: | 28 seconds maximum, any measurement |
| Bubble Point Pressure: | 13 psig minimum, any measurement 15.6–22 psig, average of any eight measurements |
| Water Entry Pressure: | 40 psig minimum, any measurement |

This membrane is also suitable for the production of raw sausage, like cervelat or salami sausage; in view of the fact that the release of gas in the case of raw sausage occurs at lower temperatures over a longer period of time, the permeability of the membrane may be smaller.

By the term "membrane" is meant a relatively thin soft pliable free-standing sheet, and no specific limitations insofar as the length and width are intended.

The casings may be seamless tubes or can be produced from flat stock as for instance by heat or ultrasonic welding, by gluing or sewing. For example, a band-like membrane may be wound helicoidally into a tube. The casing may consist wholly or for the most part of the above-designated membrane.

It is preferable, for reasons of the mechanical load capacity, that the casing is supported by reinforcing components contacting at least a fraction of its surface area.

The polytetrafluoroethylene membranes, when used in accordance with the invention, are food-technologically unobjectionable, thermally stable between $-20°$ and $+250°$ C., resistant to diluted acids and lye solutions as well as common cleaning agents, and are not changed by the effects of ultrasonic and microwaves. The use of these membranes makes it possible to change the production method of parboil and raw sausages, as compared with the customary process, in an advantageous manner.

Up to now, machines were used to fill the casings with the bulk sausage. The filled casings were lined up on a spit and then one after another subjected in the smoke chambers to, in sequence:

reddening
drying
smoking
cooking or parboiling
cooling

After leaving the smoking chambers, the sausage casings may be removed by peel machines in order to produce "skinless" sausages. For this process a relatively large amount of manual labor is required.

The capital investment of an installation for the production of sausages with multiple reusable casings depends mainly on the period of time required for the sausage to remain in the casing; therefore this time must be kept to a minimum.

A portion of the time required for the reddening process should therefore preferably take place before the bulk sausage enters the casing. The smoking can be done after the shaped, coagulated and cooled sausage is ejected from the casing because the reddening and coagulating steps provide a thin integral skin on the sausage that enables the sausage to be handled. The release of water vapor, steam and other gaseous constituents, however, must occur at the beginning of the heating cycle while the sausage is still in the membrane casing. Microwave heating is ideally suited for shortening the reddening and coagulation steps.

The production of parboil sausage according to the present invention can proceed as follows:

(a) The raw bulk sausage is pre-reddened in a mixing machine under exclusion of oxygen.

(b) The bulk sausage is filled, according to invention, into reusable casings and/or devices that are formed by a water-vapor permeable membrane that is pliable, heat stable and non-adherent to bulk sausage by means of fill machines, paste fill machines or dividing machines.

(c) The filled casings or devices are then heated to approximately 35° C. to attain a desired degree of redness in a continuous reddening apparatus as, for example, by convection heating.

(d) Subsequently the filled casings or devices are heated for the coagulation step to about 80° C., as, for instance, in the customary way by steam or hot air or specially advantageously by means microwave energy which so far, to the knowledge of the inventor, has not been used for this purpose.

(e) Next, the filled casings or devices are cooled, for example, by means of cold water, cold air, liquid oxygen, etc.

(f) Now the casings or devices are opened by automatic removal of the end caps, after which the sausage is ejected, for instance, by compressed air. The empty casings are returned in a closed cycle to the fill station, whereby in suitable intervals cleaning takes place, as for instance by ultrasonic waves.

(g) The sausages are subsequently either continuously or intermittently smoked, on appropriate conveyors or special racks having only a small contact area with each sausage. The tanning effect of the smoke essentially contributes to the integrity of the sausage.

(h) Subsequently the sausages are cooled and are ready for shipment.

The following describes preferred embodiments of the apparatus and process for the production of caseless sausage, as shown on the attached drawing.

DESCRIPTION OF THE PREFERRED EMBODIMENTS

Figure 1:
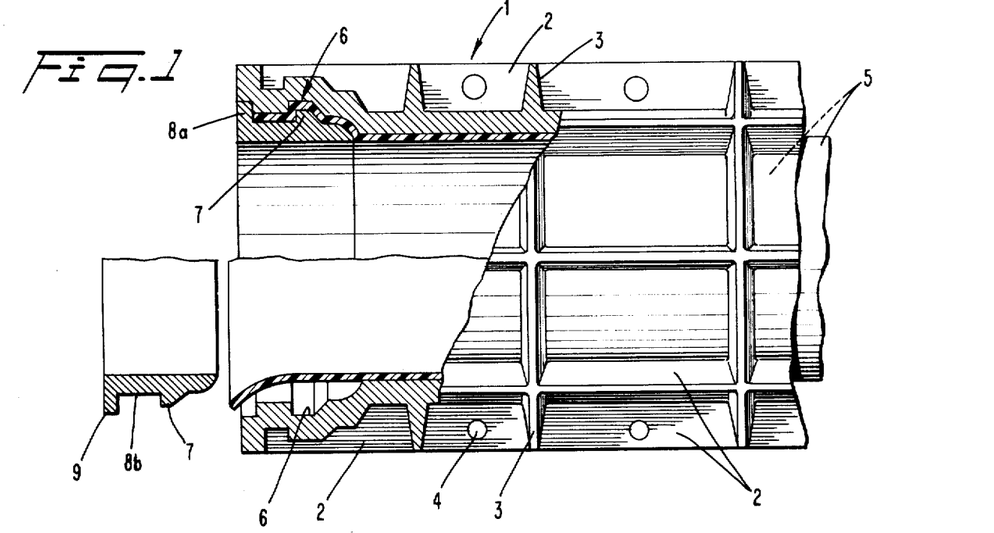
FIG. 1 shows a simplified sectional view of the end portion of a device made in accordance with the present invention for the production of sausage.

In accordance with the present invention, as embodied herein and with reference to FIG. 1, there is provided a reusable tubular sausage casing 5 of a porous polytetrafluoroethylene (PTFE) membrane, the details of which were discussed earlier. Tubular casing 5 is shown in the shape of a hollow right circular cylinder but the scope of the present invention is not intended to be so limited. Tubular casing 5 is shown positioned in the interior of support structure 1 which will discussed henceforth.

Figures 2, 3, 4:
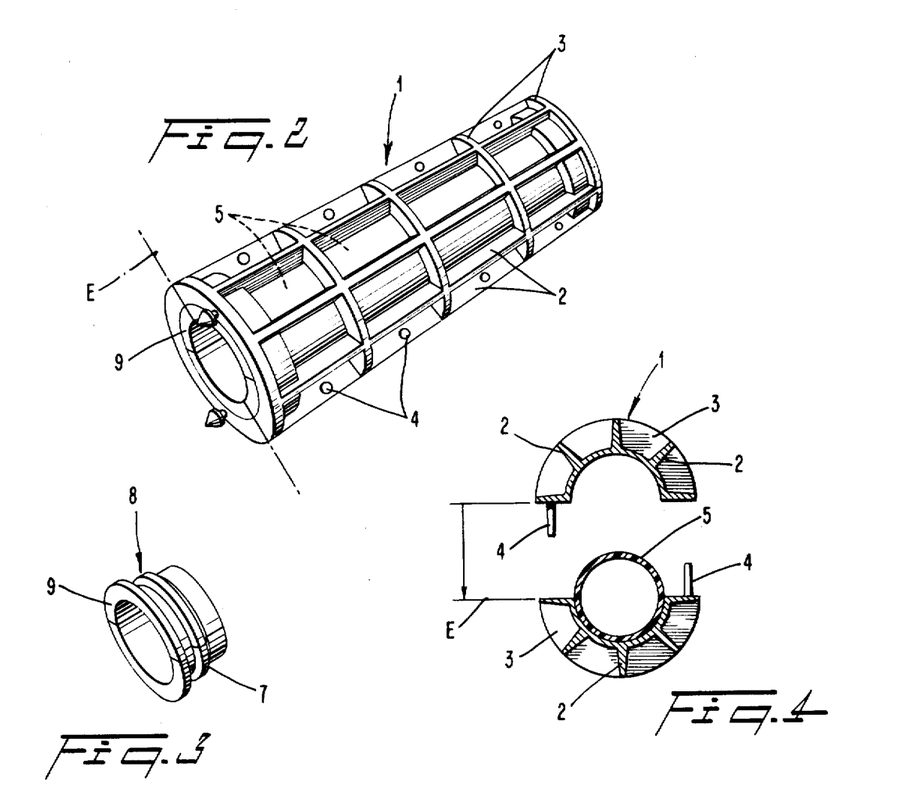
FIG. 2 is a simplified perspective view of the device shown in FIG. 1.
FIG. 3 is a perspective view of the retaining ring portion of the device.
FIG. 4 is a vertical section of the device with the upper part removed.

In accordance with the invention, and as embodied herein, there is provided means for supporting the reusable casing at its outside surface. A preferred device incorporates a support structure designated in its entirety by 1, which is composed of parallel longitudinal ribs 2, and ring-shaped cross ribs 3 in a lattice arrangement. The lattice structure 1 is designed in two parts, that is, it is divided into practically equal halves along a parting plane designated E in FIG. 2. The two halves are connected along the parting plane by screws 4 for possible disassembly (compare in this connection also FIG. 4). The longitudinal ribs 2 and cross ribs 3 are aligned with their inside edges along an imaginary cylinder which corresponds to the diameter of the sausage to be produced. Inside the lattice structure 1 a tube-like casing 5 which is made of the above defined porous PTFE membrane is fastened to the lattice structure 1 at its end sections by retaining rings 8. For this purpose the ends of the longitudinal ribs 2 are provided with a circular groove 6 which matches and/or engages the shoulder 7 of retaining ring 8 (FIG. 3).

The outermost end section of the retaining ring 8 is shaped into a circular flange 9. Preferably, the retaining ring 8, as FIG. 1 shows, is divided into two equal halves 8a/8b, for ease of assembly. The end section of the casing 5 is easily fastened to the lattice structure 1 by pushing the two retaining ring halves 8a/8b into it until the circular shoulder 7 snaps into the groove 6 thus capturing the casing end therebetween.

Figure 5:
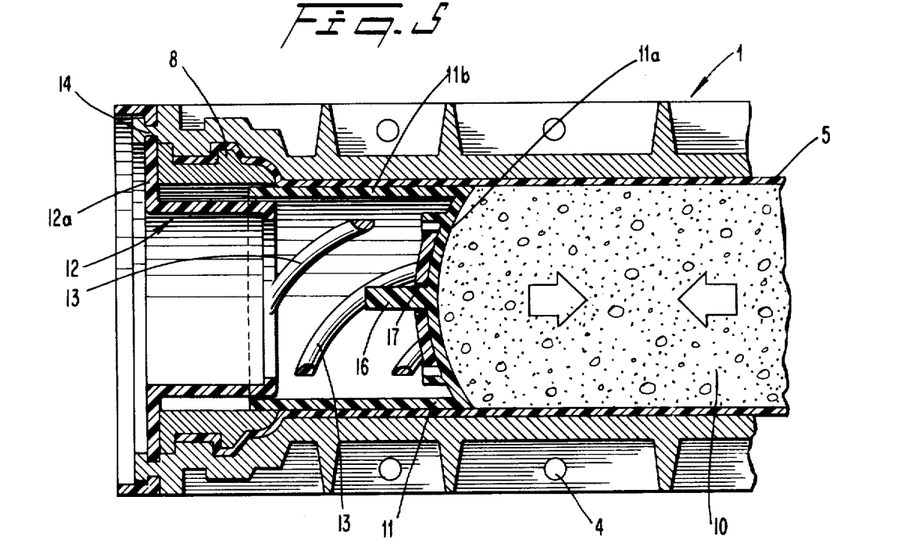
FIG. 5 shows a cross-section of the end segment of the completely assembled device.

During the process the bulk sausage 10, as depicted in FIG. 5, expands under the effect of heat and subsequently contracts again during cooling. In accordance with the invention, means for restraining the sausage material within the tubular casing and for compensating for the change in volume of the sausage is provided and is shown in FIGS. 5 to 8.

As embodied herein, and as shown in FIG. 5, a floating piston 11 is positioned within the retaining ring 8. Piston 11 is provided at one end with a concave face surface 11a whose shape matches the contour of the sausage to be produced. A cylindrical guide sleeve 11b is adjacent to the piston face surface 11a, which in a preferred design only glides on the inner surface area of the retaining ring 8 and thus does not even come in contact with the easily vulnerable casing 5. An insert designated by 12 carries a plastic coil spring 13 on the side facing the piston 11, which rests against the curved wall of piston 11, and according to FIG. 5, tends to press or bias the piston to the right. Thus it is assured that the piston always rests against the outer area of the sausage 10 and that changes in volume of the bulk sausage are automatically compensated by the elasticity of the spring 13.

The bushing 12 is practically cup-shaped like a pot and has on its vertically arranged circular flange (as shown in FIG. 5) two key-hole-like slots with which it can be mounted for removal in customary fashion on studs 14 of the lattice structure. In this way it is sufficient to put the bushing 12 with the slots 15 having their wider section aligned over the stud 14. By turning bushing 12 slightly, the stud 14 securely engages the bushing.

Figures 6, 7, 8:
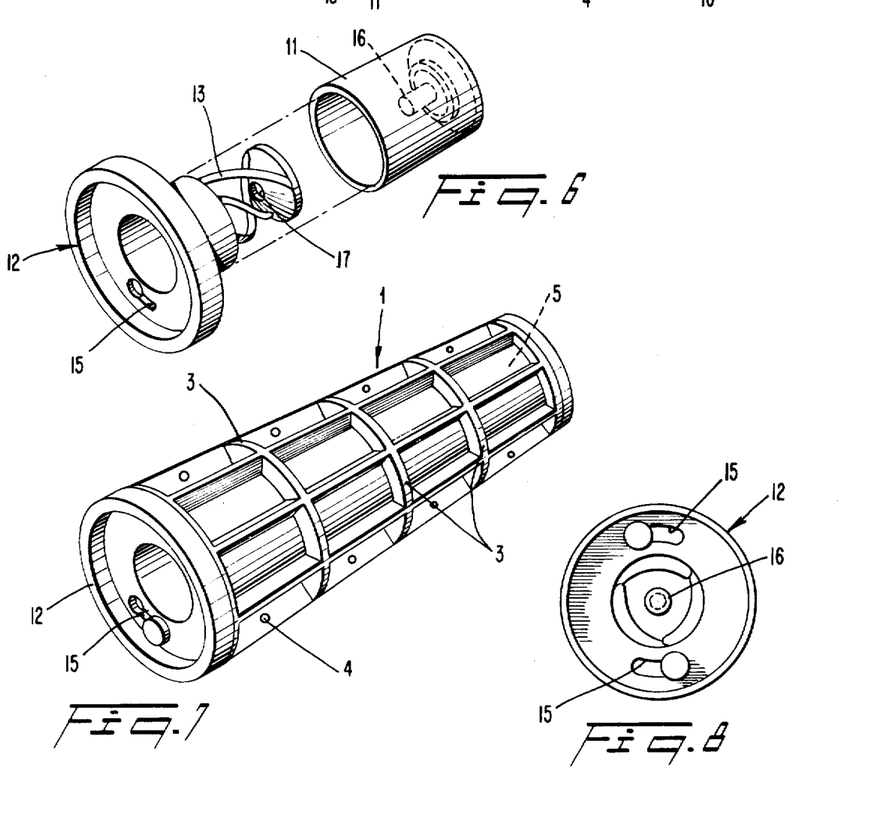
FIG. 6 is an exploded view in perspective of a structural detail.
FIG. 7 shows the complete device in simplified perspective.
FIG. 8 is a front view of the device.

As FIG. 6 shows, the piston is provided with a guide pin 16 in the center part of its curved face surface 11a which, during insertion of the bushing 12, engages with a bored hole 17 in the bushing and thus provides a secure alignment of the two parts.

The invention can be altered in numerous ways by any person skilled in the art, as for instance, it is of course not necessary to support the casing 5 around its circumference by a lattice structure, but some type of pipe with a solid but porous wall could be used as well. A pipe of this type could preferably consist of a porous, non-metallic, air pervious material, for instance, sintered glass. In this case, retaining parts for the removable attachment of the casing 5 would also have to be provided for both end sections.

If the sausage 10 is to be removed from the described device, it is sufficient to take off bushing 12 and piston 11, and eject the sausage from the casing 5 by compressed air. The casing 5, which remains in the device, is washed and reused in the following manufacturing process.

It would also be possible to design the above-mentioned pipe in form of half-cylindrical shells (not shown) which are fastened to an endless conveying device (not shown) and are joined to form a complete pipe for the support of the casing 5 shortly before introducing the bulk sausage. For the removal of the sausage the half-shells could be parted again by the conveyor system.

Instead of the curved face surface 11a of the piston 11, a flat surface could be used advantageously for a sausage which is to be sliced before it is sold. In this configuration, no waste is created during slicing.

Figure 9:
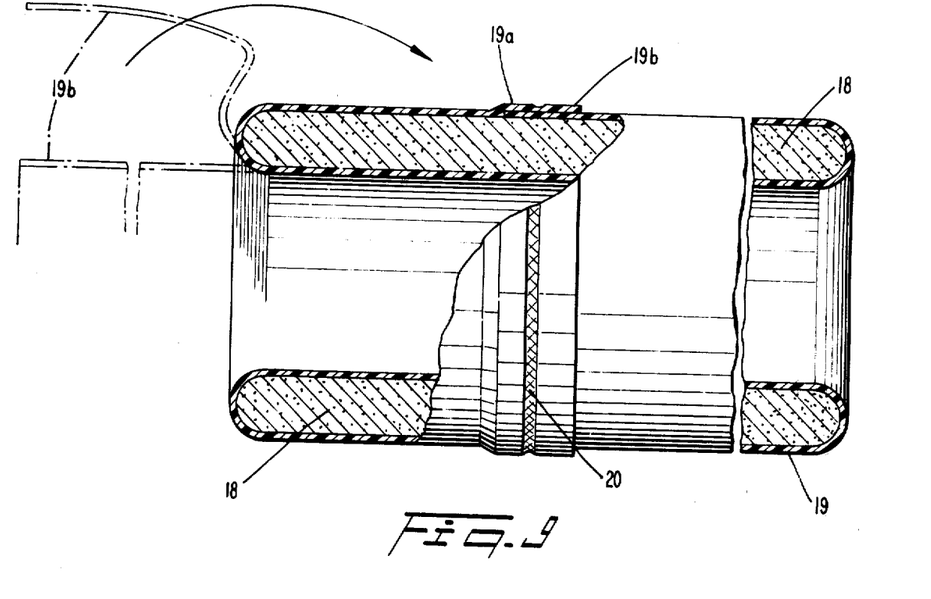
FIG. 9 is a longitudinal cross-section of a variation of the device shown in FIG. 1 but still made in accordance with the present invention.
Figure 10:
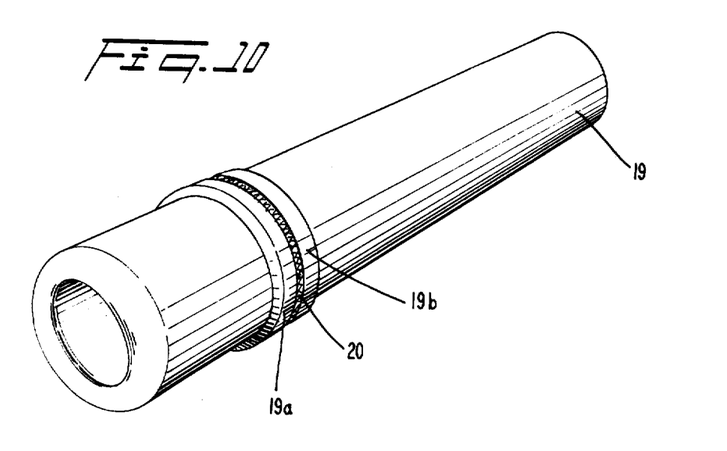
FIG. 10 shows the variation of FIG. 9 in perspective.

In FIG. 9, which depicts another device made in accordance with the present invention, the device has a pipe 18 which may be formed of sintered stainless steel, or preferably of a porous, non-metallic air pervious material (for example, sintered glass). A tube-like casing 19 of porous PTFE membrane, as described before, is laid around the pipe 18 as to completely encase the inner and outer surface of the pipe with the casing ends 19a/19b turned back and overlapping each other on the outer surface of the pipe where they are welded together in a circular bead 20.

FIG. 9 depicts in dashed lines how the one casing end 19b is turned back around the end section of the pipe 18 in the direction of the arrow until it overlaps the other casing end 19a.

Figure 11:
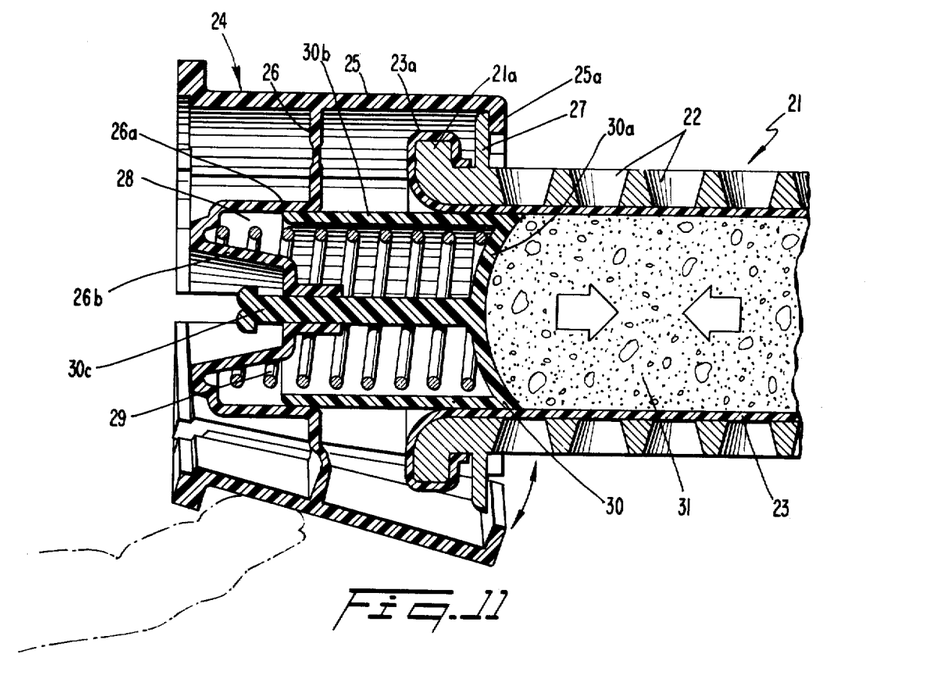
FIG. 11 shows a cross-section of the end segment of yet another version of the device shown in FIG. 1.

Another variation of apparatus made in accordance with the present invention and shown in FIG. 11 includes a pipe 21 which, for instance, can be formed of stainless steel or an adequate artificial material such as polyamid or sintered, unstretched polytetrafluorathylene, and provided with numerous holes. A porous PTFE casing 23 of the type defined above is turned back around the flanged end 21a of the pipe 21 at the position 23a and thus secured at the pipe end 21a by stretching over the flange.

A cap 24 is divided in the direction of the circumference into several retaining fingers 25 (also compare FIG. 12), which are mounted on a circular rib 26 and can pivot lever-like on their mounting point. The end 25a of each retaining finger 25 which is turned toward the inside engages in its end position a support flange 27 on the pipe.

A recess 28 in the rib 26 houses a coil spring 29 whose opposite end is compressed against the curved face 30a of the piston 30. The cylindrical sleeve 30b of the piston 30 which is adjustably positioned in a corresponding section 26a of the rib 26 as well as in the pipe 21, could however also be placed (in order to protect the casing) in section 26a only. In this way the piston 30 is resiliently pressed or biased against the end of the bulk sausage and thus balances the expansion and contraction of the bulk sausage as shown by the two arrows.

With its guide sleeve 26b pushed over the end section of a guide bar which is part of the piston 30, the cap 24 functions as a centering and guiding device for the piston 30. As demonstrated in the lower portion of FIG. 11, the cap 24 can be disengaged and pulled off, if need be, by depressing with finger pressure.

The spring 29 not only serves for the compensation of changes in volume of the bulk sausage 31, but also exerts an oppositely directed force on the cap 24, so that the end of the retaining finger 25a is forced against the support flange 27; simultaneously the end of the retaining finger 25a also can exert a pressure in a radial direction which contributes to holding the casing 23 in place in a modification (not shown) to the embodiment in FIG. 11 wherein the turned back end of casing 23 extends past flange 27.

Figures 12, 13:
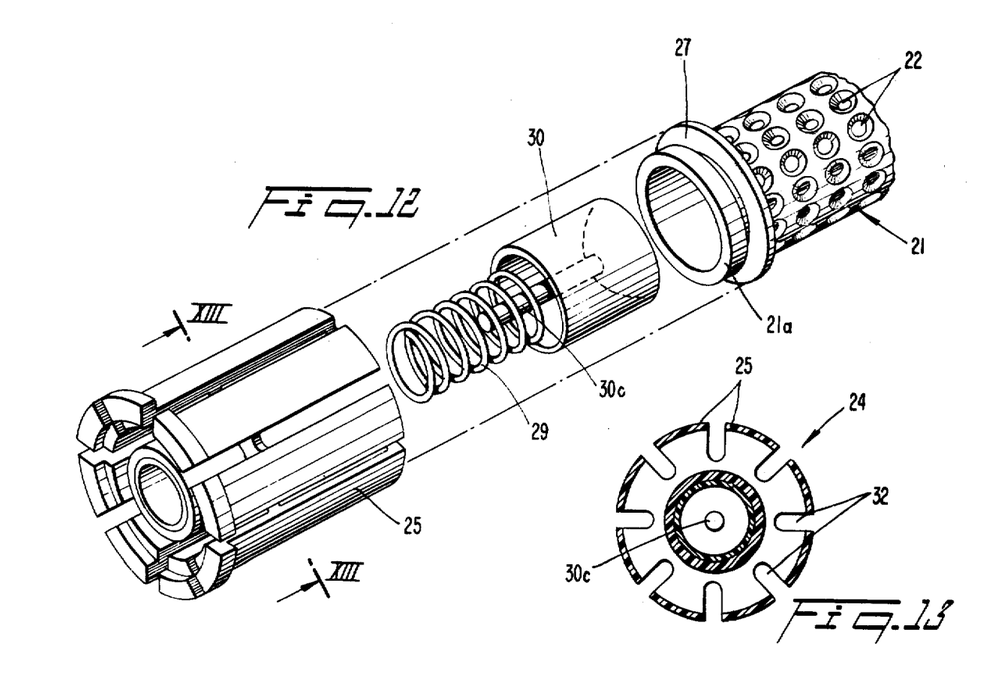
FIG. 12 is an exploded view in perspective of a version shown in FIG. 11.
FIG. 13 is a section along plane XIII/XIII of the version shown in FIG. 12.

As FIG. 13 shows, the cap 24 essentially consists of a heavy-walled tube made of synthetic material and whose wall is provided with several parallel slots 32 which are directed radially toward the inside.

Parboil sausages typically have diameters of from 15 to 200 mm, some of them also more. For instance, a small sausage weighing 55 g and having a diameter of 22 mm can be heated by microwaves to 35° C. for 15 minutes for the process of reddening and ripening, and to 80° C. and 3 minutes for the coagulation. Thereby the raw bulk sausage releases 5 g of steam in the course of 18 minutes.

Should the coagulation take place by means of microwave energy, the casings and/or devices used must not contain any metallic constituents. In this case the support components of the device advantageously consist of perforated synthetic materials like polyamide or sintered unstretched polytetrafluoroethylene.

The coagulation process by means of microwaves can take place in such a way where the filled casings and/or devices are passed thru a stream of microwaves at a set cycle. While passing thru the microwaves, the casings and/or devices are turned as described later, in order to assure an even heating. Heat is not applied from the outside, but is produced simultaneously and nearly evenly throughout the entire mass of sausage, so that coagulation advances from within to the outside.

Heat generation in the bulk sausage starts instantly at actuation of the microwave energy and stops just as abruptly when turned off. Since no heat transfer mediums need be heated with microwave apparatus and only extremely little heat is dissipated to the environment, significant energy conservation is possible.

During microwave heating, the various components of the bulk sausage, namely water, fat and protein, are heated to different degrees. In addition, because the energy absorption is dependent on the temperature on account of the temperature dependence of the dielectric constant, local (spot) overheating may take place. To avoid this, microwave heating is advisably applied periodically in order to allow the temperature of the bulk sausage mass to become balanced. Good results are obtained when the duration of the first heating period amounts to no more than 50 seconds, the duration of the following heating periods is shortened by 30% each, and the duration of the heating intervals, starting at 10 seconds, be increased until the heating intervals match the heating periods. The heating intervals can be obtained by using multiple sources of microwaves with a specific distance between each source along the process path. In such application, it is advantageous to position between the microwave sources a different type of heating unit, for instance, infrared heating, is used, in order to avoid the cooling of the bulk sausage and to further accelerate coagulation.

The selection of power output of the microwave sources is of great importance for fast and even coagulation. Although the speed of coagulation is accelerated by increased power output, the evenness of the coagulation decreases. On the other hand, too small a power output is uneconomical on account of too slow a production speed. However, it is easily possible for an expert to determine the proper parameters.

Rotation of the filled casings and/or devices during the microwave heating process is indispensable since adjoining casings shield or block each other from the microwaves. The period of rotation should be shorter by more than one order of magnitude than the period required for coagulation. This amounts to at least about 12 revolutions per minute.

The new casing, apparatus, and process of the invention provide a sausage that has far superior resistance to bacterial contamination than sausages produced in the usual water-vapor-impervious, one-use, cellulosic casings, which is the present industry standard for frankfurter production. Because the smoking step can be performed on the sausage itself, with no cellulosic membrane of varying permeability to smoke, the tanning effect of the smoking step is more uniform and provides superior resistance to bacteria. Also, there is no possibility of cutting into the sausage during a peeling step, which could destroy the integrity of the sausage skin and permit bacterial access to the interior of the sausage.

The invention permits use of a faster sausage making procedures (microwave) in the reddening and coagulation steps. Also, the smoking step can proceed at a much faster rate, because there is no barrier to the smoke such as exists when a cellulosic casing is used. The invention permits production of sausages with less labor than the use of cellulosic casings, indeed, the invention permits manufacture of sausage without contact with human hands.

What is claimed is:

1. A process for the production of caseless sausages, the process comprising the steps of inserting pliable, reusable porous casings into casing support structures, the pliable casings conforming to the internal cross-sectional shape of the support structures, the reusable tubular casings being formed of a vapor-permeable highly porous polytetrafluoroethylene membrane having a microstructure of nodes interconnected by fibrils, said membrane being heat stable, and non-adherent to bulk sausage; filling the reusable casings with unprocessed sausage material; reddening the sausage material to a desired degree of redness by heating the filled casings; coagulating the bulk sausage material by continued heating of the sausage material, said reddening and coagulating steps including the concurrent steps of venting radially through the porous casing excess steam, water vapor, and other gaseous constituents released by the sausage material during said reddening and coagulating steps; ejecting the coagulated sausage material from the porous casings, the integrity of the membrane being maintained during said ejection step, and the external surface of the ejected sausage being smooth and its integrity being maintained during the ejection step; cleaning said reusable casings for subsequent refill with unprocessed sausage material; and refilling the reusable casings.

2. The process of claim 1 in which the ejection step includes pneumatically ejecting the coagulated sausage material in a substantially axial direction.

3. The process as in claim 1 wherein the casings and the casing support structures are non-metallic, and said reddening and coagulating steps include the step of irradiating the casing and contained sausage material with microwaves.

4. The process as in claim 1 wherein said cleaning step includes the step of exposing the casings to ultrasonic waves.

5. The process as in claim 1 further including the step of pre-reddening the unprocessed sausage material to less than the desired degree of redness, said pre-reddening step occurring prior to the filling step.

6. The process as in claim 1 for making parboil sausages, wherein the reddening step includes heating the filled casings to a temperature of about 35° C. and the coagulating step includes heating the sausage material to about 80° C.

7. The process as in claim 1 further including the step of smoking the coagulated sausage material after the ejecting step.

* * * * *